US011285619B2

United States Patent
Motowaki

(10) Patent No.: US 11,285,619 B2
(45) Date of Patent: Mar. 29, 2022

(54) ROBOT HAND AND ROBOT

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 70 days.

(21) Appl. No.: 16/837,176

(22) Filed: Apr. 1, 2020

(65) Prior Publication Data

US 2020/0406475 A1    Dec. 31, 2020

(30) Foreign Application Priority Data

Jun. 25, 2019   (JP) .............................. JP2019-117555

(51) Int. Cl.
| | | |
|---|---|---|
| *B25J 15/00* | (2006.01) | |
| *B25J 15/08* | (2006.01) | |

(52) U.S. Cl.
CPC ........... *B25J 15/0038* (2013.01); *B25J 15/08* (2013.01)

(58) Field of Classification Search
CPC .... B25J 15/0038; B25J 15/08; B25J 15/0293; B25J 15/0033; B25J 15/00
See application file for complete search history.

(56) References Cited

U.S. PATENT DOCUMENTS

| | | | | |
|---|---|---|---|---|
| 3,037,651 A | * | 6/1962 | Smith ...................... | B66F 9/18 414/621 |
| 4,368,859 A | * | 1/1983 | Focke .................... | B65H 16/06 242/129.51 |
| 4,575,303 A | * | 3/1986 | Lindell ................... | B60P 3/035 414/430 |
| 6,276,628 B1 | * | 8/2001 | Focke ................... | B65H 67/065 242/559.1 |
| 9,073,716 B2 | * | 7/2015 | Brighenti ............. | B65H 19/102 |
| 2019/0152067 A1 | * | 5/2019 | Honsberg ............. | B25J 15/0213 |

FOREIGN PATENT DOCUMENTS

| | | |
|---|---|---|
| JP | S63-83290 U | 6/1988 |
| JP | H11-214889 A | 8/1999 |

* cited by examiner

*Primary Examiner* — Stephen A Vu
(74) *Attorney, Agent, or Firm* — Maier & Maier, PLLC

(57) ABSTRACT

A robot hand includes holding members radially receiving a tape reel between flat-plate-shape main bodies facing each other, and an actuator configured to open and close the holding members. The holding members are openable and closable between a reel hold position and a tape pull-out position, the reel hold position is a position at which a distance between inner surfaces of the main bodies is greater than a distance between outer surfaces of pair of side plates of the tape reel, the tape pull-out position is a position at which a distance between outer surface of the main bodies is smaller than a distance between inner surfaces of the pair of side plates. The holding members include rail portions and cut-outs provided in the rail portions.

10 Claims, 17 Drawing Sheets

ROBOT HAND AND ROBOT

CROSS-REFERENCE TO RELATED APPLICATIONS

This application is based on and claims priority to Japanese Patent Application No. 2019-117555 filed on Jun. 25, 2019, the content of which is incorporated herein by reference in its entirety.

FIELD

The present invention relates to a robot hand and a robot.

BACKGROUND

Conventionally, in surface-mount technology (SMT) in which electronic components are mounted onto a printed circuit board, a chip mounter is used (cf., Japanese Unexamined Patent Application Publication No. H11-214889). The chip mounter supplies a tape on which electronic components are held at regular intervals from a tape reel to a transfer head using a tape feeder, and picks up an electronic component from the tape using the transfer head to mount the electronic component onto a substrate. Further, there is known a robot hand for gripping a tape reel (cf., Japanese Unexamined Utility Model Application Publication No. S63-083290).

SUMMARY

An aspect of the present disclosure relates to a robot hand that holds a tape reel having a pair of circular side plates facing each other, the robot hand including a pair of holding members each having a flat-plate-shape main body, the pair of holding members configured to receive the tape reel in a radial direction of the tape reel so that the tape reel is located between the pair of main bodies facing each other, and an actuator configured to open and close the pair of holding members in a facing direction of the pair of main bodies, the facing direction being a direction in which the pair of main bodies are facing each other, wherein the pair of holding members are openable and closable by the actuator between a reel hold position and a tape pull-out position, the reel hold position is a position at which a distance between inner surfaces of the pair of main bodies is greater than a distance between outer surfaces of the pair of side plates, the tape pull-out position is a position at which a distance between outer surface of the pair of main bodies is smaller than a distance between inner surfaces of the pair of side plates, each of the pair of holding members includes a rail portion projecting from the inner surface of the main body, the rail portion extending along a circumference portion of the main body radially at an outside of the side plates, and a cut-out provided in the rail portion, wherein the cut-outs of the pair of holding members form an opening in a state in which the pair of holding members are placed at the tape pull-out position, the opening has a width greater than a width of a tape wound around the tape reel so as to allow the tape to pass through the opening.

DETAILED DESCRIPTION OF EMBODIMENTS

Hereinafter, a robot hand 1 and a robot 10 according to an embodiment will be described with reference to the drawings. As shown in FIG. 7 through FIG. 14, the robot 10 is intended for holding and transferring a tape reel R for SMT (surface-mount technology). The robot 10 includes: a robot arm 10a; and the robot hand 1 connected to a tip of the robot arm 10a and configured to hold the tape reel R. One example of the robot 10 is a six-axis vertical articulated robot, which is capable of changing a position and a posture of the robot hand 1 three-dimensionally by movements of joints of the robot arm 10a. The robot 10 is connected to a controller (not shown), and the robot arm 10a and the robot hand 1 are operated according to control commands from the controller.

The tape reel R includes a pair of thin and flat disc-shaped side plates S (cf., FIG. 8 through FIG. 13). The pair of side plates S are disposed in parallel, facing each other with a space therebetween. Between the pair of side plates S, there is a reel core at a central portion of the space, and a long tape T is wound around the reel core. The tape T holds electronic components such as semiconductor chips at regular intervals. An attachment hole H for supporting the tape reel R in a rotatable manner is provided at a central part of the tape reel R. At a leading end of the tape T, a fixation tape T' for fixing the leading end to another portion of the tape T is attached (cf., FIG. 10). One end of the fixation tape T' is not adhesive, and does not have contact with the rolled tape T.

Figure 1:
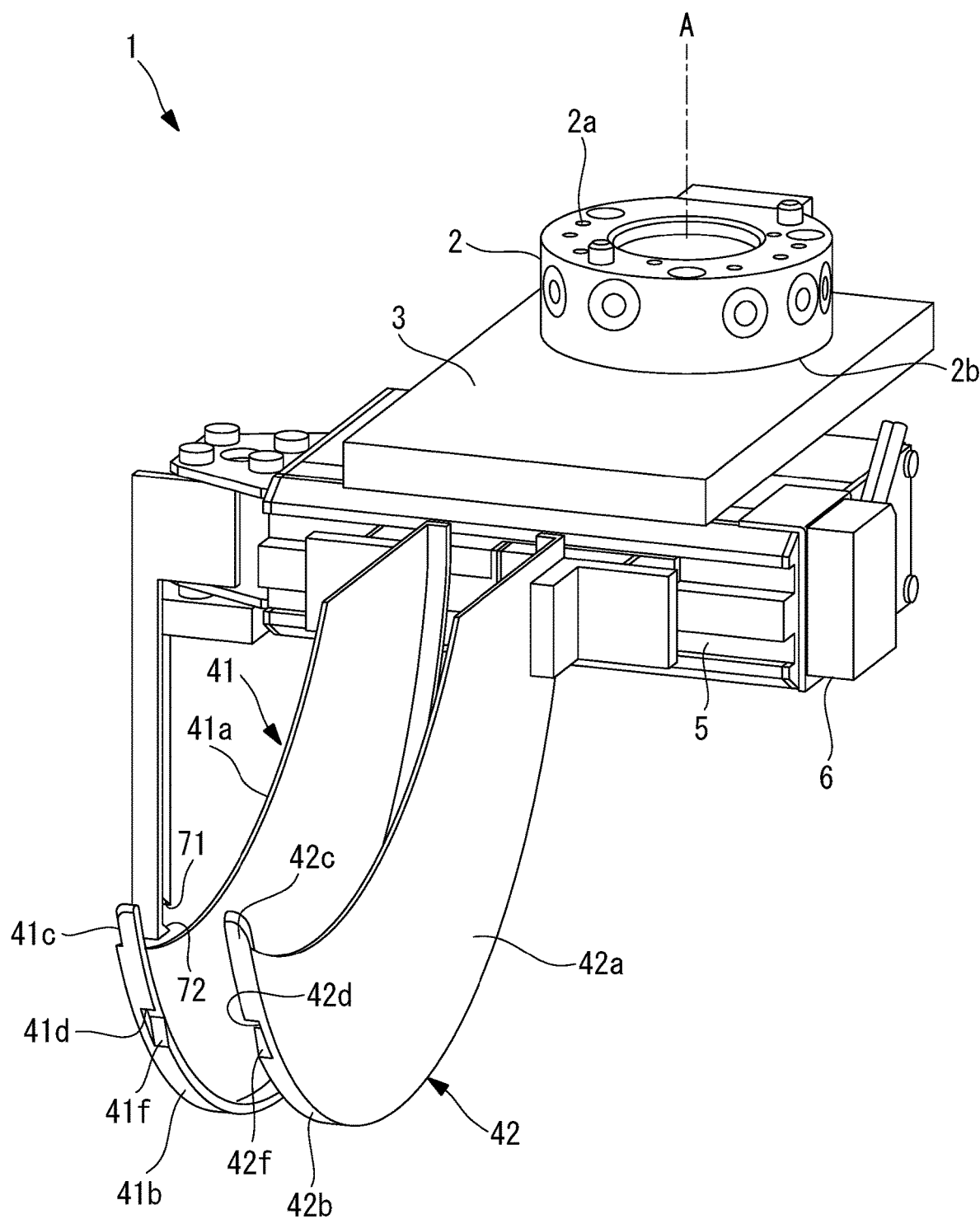
FIG. 1 is a perspective view illustrating an entire configuration of a robot hand according to one embodiment.
Figure 2:
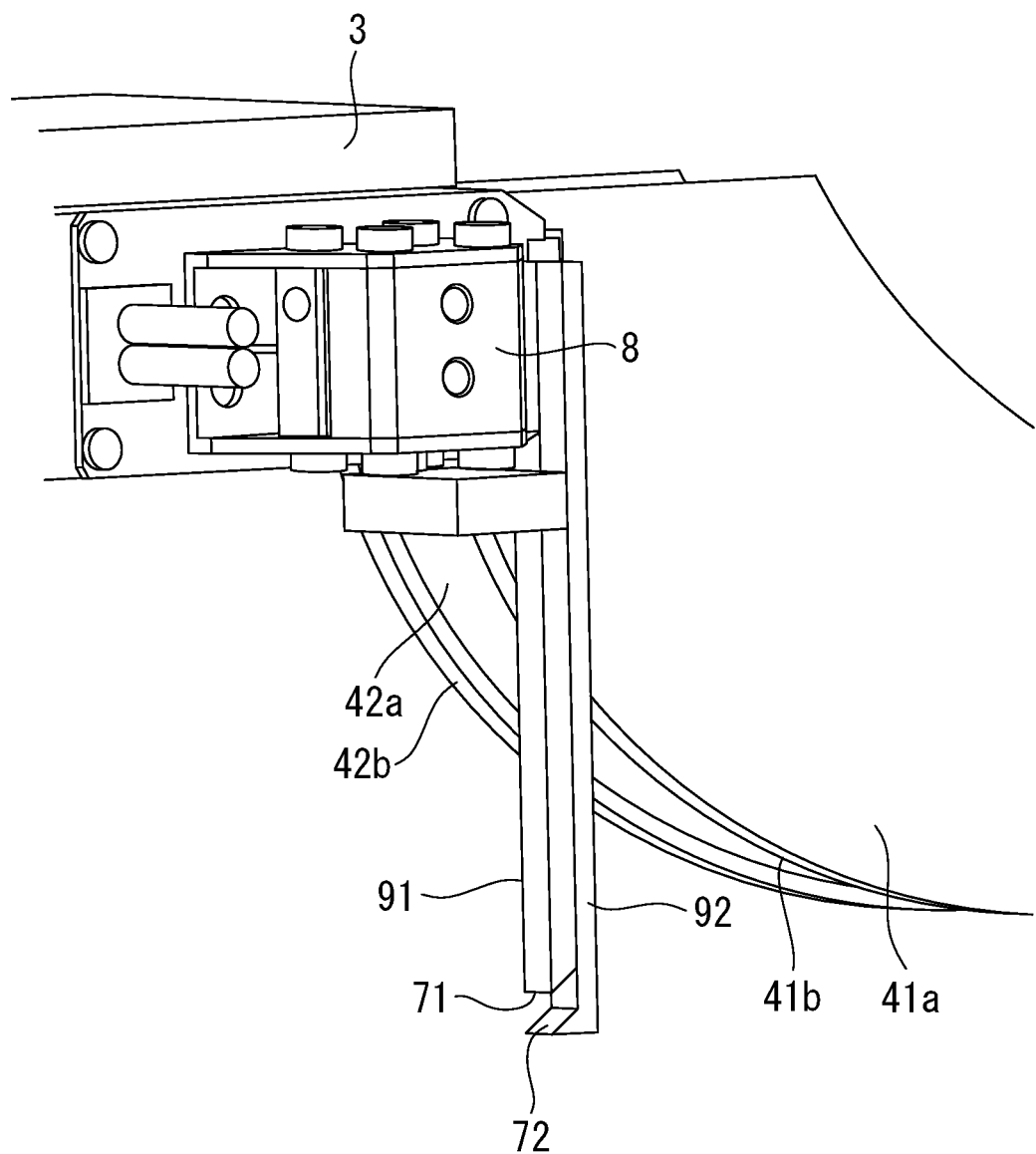
FIG. 2 is a view of the robot hand shown in FIG. 1 seen from another direction.
Figure 3:
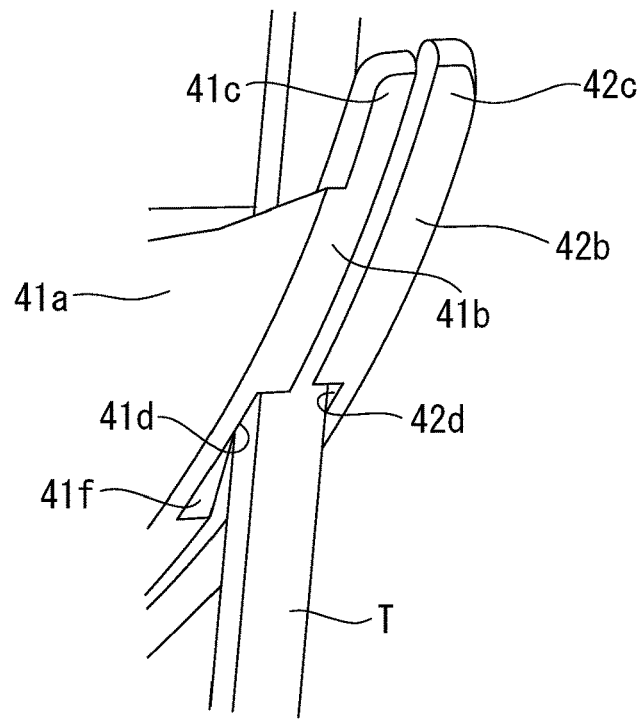
FIG. 3 is a perspective view illustrating tip end portions of a pair of holding members.
Figure 4:
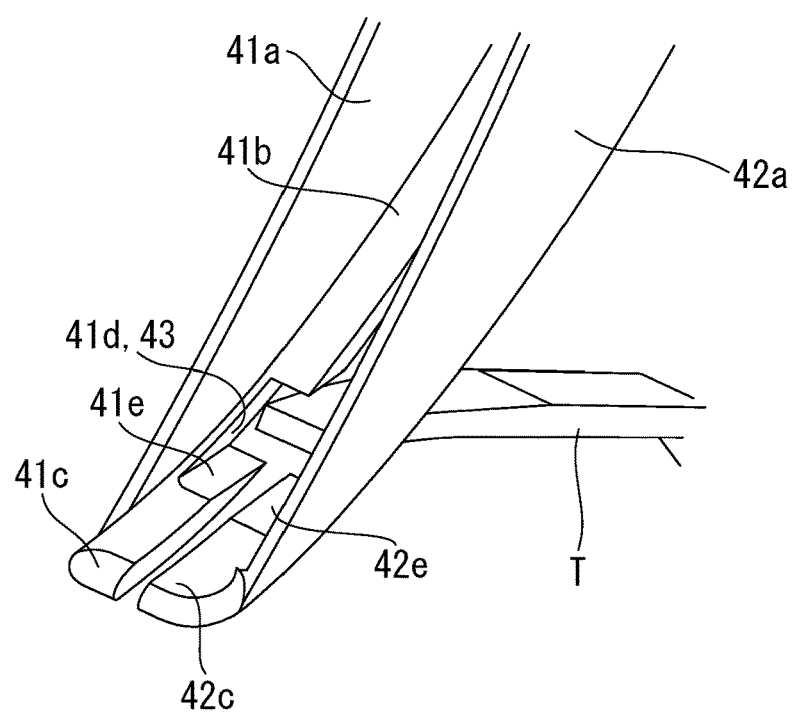
FIG. 4 is a perspective view illustrating the tip end portions of the pair of holding members shown in FIG. 3 seen from another direction.

As shown in FIG. 1, the robot hand 1 includes: an automatic tool changer (ATC) 2 attachable/detachable to/from a wrist flange 10b at a tip end of the robot arm 10a; a base 3 fixed to the ATC 2; a pair of holding members 41 and 42 that holds the tape reel R; an actuator 5 that opens/closes the pair of holding members 41 and 42; and a sensor 6 that detects the fixation tape T'. As shown in FIG. 2, the robot hand 1 also includes: a pair of gripping claws 71 and 72 that grip the fixation tape T'; and an actuator 8 that opens/closes the pair of gripping claws 71 and 72.

The ATC 2 is a cylindrical or annular member, and includes a robot attachment surface 2a and a tool attachment surface 2b that face each other in a direction along a center axis A. The robot attachment surface 2a is attached to the wrist flange 10b coaxially with the wrist flange 10b. The base 3 is fixed to the tool attachment surface 2b. As one example, the base 3 is a flat-plate-shape member perpendicular to the center axis A.

The pair of holding members 41 and 42 are supported on the base 3 via the actuator 5. The pair of holding members 41 and 42 are disposed facing each other, and receive the tape reel R between the pair of holding members 41 and 42 in a radial direction of the tape reel R. Specifically, the one holding member 41 includes a main body 41a and a rail portion 41b, and the other holding member 42 includes a main body 42a and a rail portion 42b.

The main bodies 41a and 42a are intended for respectively supporting outer surfaces of the side plates S. The main bodies 41a and 42a are thin flat-plate-shape members, and disposed along the outer surfaces of the side plates S, respectively. The main bodies 41a and 42a are disposed in parallel to each other, facing the other with a space therebetween, and each main body includes an inner surface on a side facing the side plates S and an outer surface on a side facing opposite to the side plates S. The outer surfaces and the inner surfaces of the main bodies 41a and 42a are in a shape of a part of a circle having a radius equal to or substantially equal to a radius of the side plates S. On a side opposite of an arc of the main bodies 41a and 42a, there is an insertion opening for inserting and removing the tape reel R. In order to allow insertion/removal of the tape reel R in a radial direction into/from the space between the main bodies 41a and 42a through the insertion opening, a length of the arc of the main bodies 41a and 42a is equal to or shorter than a length of an arc of a half circle having a radius equal to or substantially equal to the radius of the side plates S. Portions of the main bodies 41a and 42a corresponding to attachment holes H are cut out.

A width of the main bodies 41a and 42a is broad on a side of base ends which is one end side of the arc in a circumferential direction, and narrowed on a side of tip ends which is the other end side of the arc in the circumferential direction. It is preferable that the width at the tip end portions of the main bodies 41a and 42a is gradually narrowed toward the tip ends. In the referenced drawings, the main bodies 41a and 42a are in a shape in which one of pointed portions of a crescent shape is cut out. The actuator 5 is connected to base end portions of the main bodies 41a and 42a. In the referenced drawings, the main bodies 41a and 42a are disposed on a side opposite of the ATC 2 with respect to the base 3 in a direction along the center axis A. Further, the main bodies 41a and 42a are disposed along a plane parallel to the center axis A, and in a radial direction which is perpendicular to the center axis A, the base ends of the main bodies 41a and 42a are on an inner side which is closer to the center axis A, and the tip ends of the main bodies 41a and 42a are on an outer side which is farther from the center axis A.

The rail portions 41b and 42b are portions that support outer peripheral surfaces of the pair of side plates S. The rail portion 41b projects from the inner surface of the main body 41a toward the inner surface of the main body 42a, and the rail portion 42b projects from the inner surface of the main body 42a toward the inner surface of the main body 41a. The rail portions 41b and 42b extend along a circumference of the arc of the main bodies 41a and 42a for an entire length of the arc, and are disposed radially outside the tape reel R inserted between the main bodies 41a and 42a through the insertion opening.

The rail portions 41b and 42b respectively include projecting portions 41c and 42c that project beyond the tip ends of the main bodies 41a and 42a in a longitudinal direction (circumferential direction of the arc) of the rail portions 41b and 42b. A outside corner portion of each of the projecting portions 41c and 42c is subjected to round chamfering, and thus, in a state in which the pair of holding members 41 and 42 are closed until the pair of projecting portions 41c and 42c are brought into contact with each other, the pair of projecting portions 41c and 42c is configured to be gradually tapered toward the tip ends.

The actuator 5 opens and closes the pair of holding members 41 and 42 by moving the pair of holding members 41 and 42 in an opening direction and a closing direction, which are directions of the pair of holding members 41 and 42 facing each other. The opening direction corresponds to a direction to which the pair of holding members 41 and 42 move away from each other, and the closing direction corresponds to a direction to which the pair of holding members 41 and 42 move closer to each other. The actuator 5 is, for example, an electric actuator, and is able to accurately control an interval between the pair of holding members 41 and 42 according to control commands from the controller.

Figure 5:
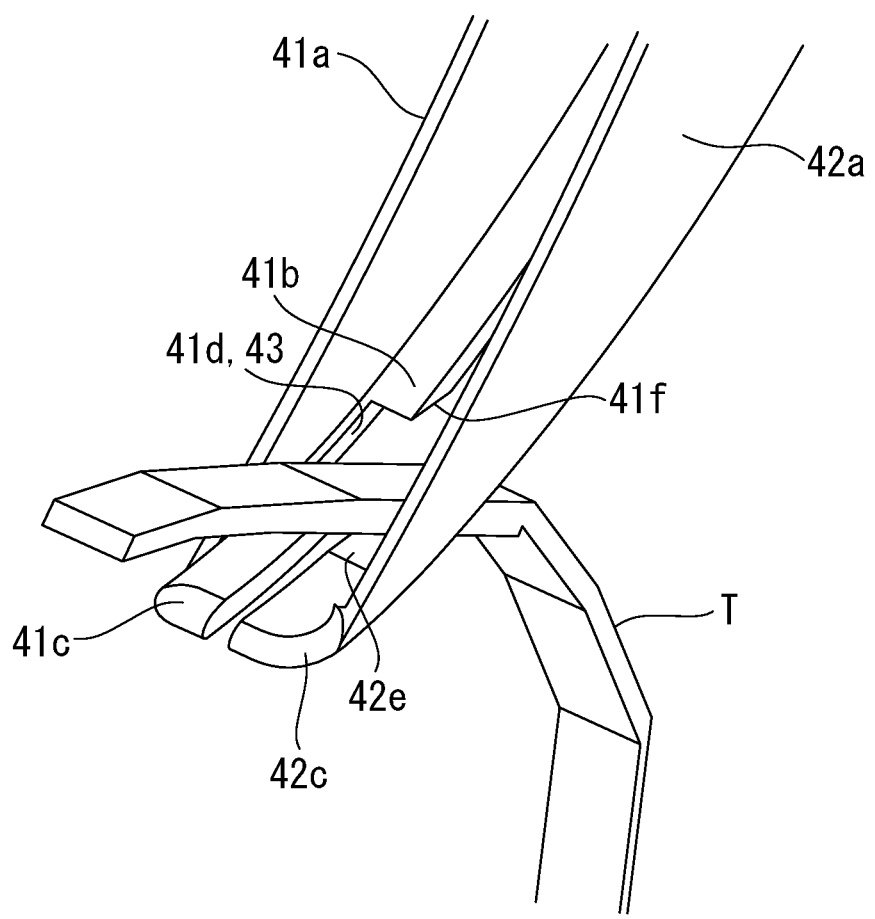
FIG. 5 is a view for illustration of a holding operation of a tape by the pair of holding members placed at a tape pull-out position.

The pair of holding members 41 and 42 may be opened and closed by the actuator 5 between a reel hold position and a tape pull-out position (cf., FIG. 5). The reel hold position is a position of the pair of holding members 41 and 42 when the tape reel R is held between the pair of holding members 41 and 42. At the reel hold position, a distance between the inner surfaces of the main bodies 41a and 42a is greater than a distance between the outer surfaces of the pair of side plates S, and a gap between the pair of rail portions 41b and 42b is smaller than a distance between the outer surfaces of the pair of side plates S. Therefore, it is possible to insert the tape reel R radially between the pair of main bodies 41a and 42a, and receive the outer peripheral surfaces of the tape reel R on the pair of rail portions 41b and 42b.

The tape pull-out position is a position at which the pair of holding members 41 and 42 are further closed than at the reel hold position, and a position of the pair of holding members 41 and 42 when the tape T is pulled out of the tape reel R. At the tape pull-out position, a distance between the outer surface of the main bodies 41a and 42a is smaller than a distance between the inner surfaces of the pair of side plates S. Therefore, it is possible to insert the tip end portions of the pair of main bodies 41a and 42a and the projecting portions 41c and 42c between the pair of side plates S.

In general, dimensions of the tape T and the tape reel R are determined by standards. Dimensions of the main bodies 41a and 42a and the rail portions 41b and 42b are designed based on the standards for the tape T and the tape reel R. For example, in a case of the tape T whose width is 8 mm, a width between the inner surfaces of the tape reel R is 11.5 mm. Therefore, in one example, at the tape pull-out position, the distance between the outer surfaces of the main bodies 41a and 42a is 10 mm.

As shown in FIG. 3 through FIG. 6, the tip end portions of the rail portions 41b and 42b are respectively provided with the cut-outs 41d and 42d. In a state in which the pair of holding members 41 and 42 are located at the tape pull-out position, a width of the cut-outs 41d and 42d is greater than the width of the tape T in a direction in which the main bodies 41a and 42a are facing each other, and the cut-outs 41d and 42d form an opening 43 through which the tape T is allowed to pass. Inner surfaces 41e and 42e on a side of the tip ends (one side) of the cut-outs 41d and 42d are inclined surfaces that are inclined with respect to a longitudinal direction of the rail portions 41b and 42b. The inclined surfaces 41e and 42e are inclined inwardly of the rail portions 41b and 42b from the base end side to the tip end side. Further, inner surfaces 41f and 42f on a side of the base ends (the other side) of the cut-outs 41d and 42d may be inclined surfaces that are inclined in the same direction as the inclined surfaces 41e and 42e with respect to the longitudinal direction of the rail portions 41b and 42b.

Figure 6:
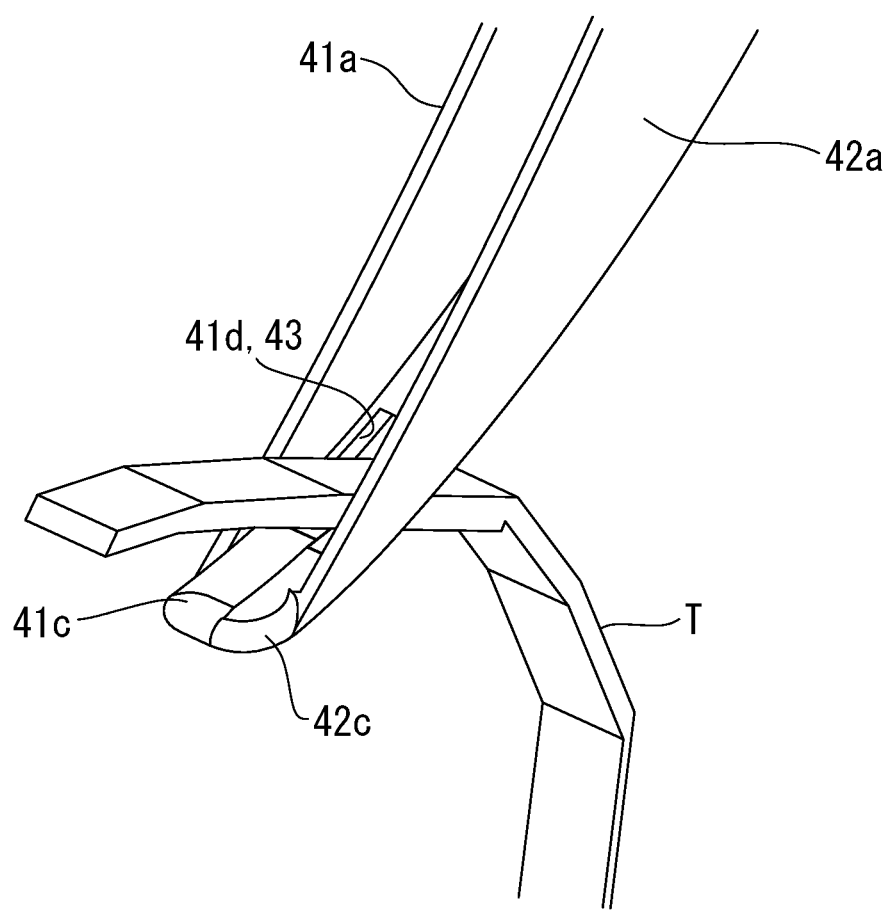
FIG. 6 is a view for illustration of a gripping operation of a tape by the pair of holding members placed at a tape gripping position.

As shown in FIG. 5, at the tape pull-out position, the pair of rail portions 41b and 42b are arranged with a gap interposed therebetween. Therefore, as shown in FIG. 6, the pair of holding members 41 and 42 are able to grip the tape T at the opening 43 in a direction of the width of the tape T by being further closed by the actuator 5 from the tape pull-out position. Specifically, at a tape gripping position in FIG. 6, an inner surface of the opening 43 is brought into contact with both side surfaces of the tape T and grips the tape T.

The sensor 6 includes a camera that acquires a two-dimensional image, for example, and detects the fixation tape T' based on colors within the two-dimensional image. In the referenced drawings, the sensor 6 is disposed at a position offset from the pair of holding members 41 and 42 in the opening/closing direction of the holding members 41 and 42, and face the same direction as the tip end of the pair of holding members 41 and 42.

the pair of gripping claws 71 and 72 are supported on the base 3 via the actuator 8, and disposed facing each other. One example of the actuator 8 is an air cylinder. The actuator 8 opens and closes the pair of gripping claws 71 and 72 in a direction in which the pair of gripping claws 71 and 72 are facing each other. A width of the pair of gripping claws 71 and 72 is smaller than the distance between the inner surfaces of the pair of side plates S in the direction perpendicular to the opening/closing direction, and the pair of gripping claws 71 and 72 can be inserted between the pair of side plates S. The pair of gripping claws 71 and 72 are able to grip the fixation tape T' in a thickness direction of the fixation tape T' by being closed by the actuator 8.

In the referenced drawings, the pair of gripping claws 71 and 72 are disposed at tip ends of the pair of shafts 91 and 92 that extend in the direction along the center axis A to a side opposite of the ATC 2 with respect to the base 3, so as to be facing each other in a direction along the center axis A. The actuator 8 opens and closes the pair of gripping claws 71 and 72 by moving at least one of the shafts 91 and 92 in the longitudinal direction.

Figure 7:
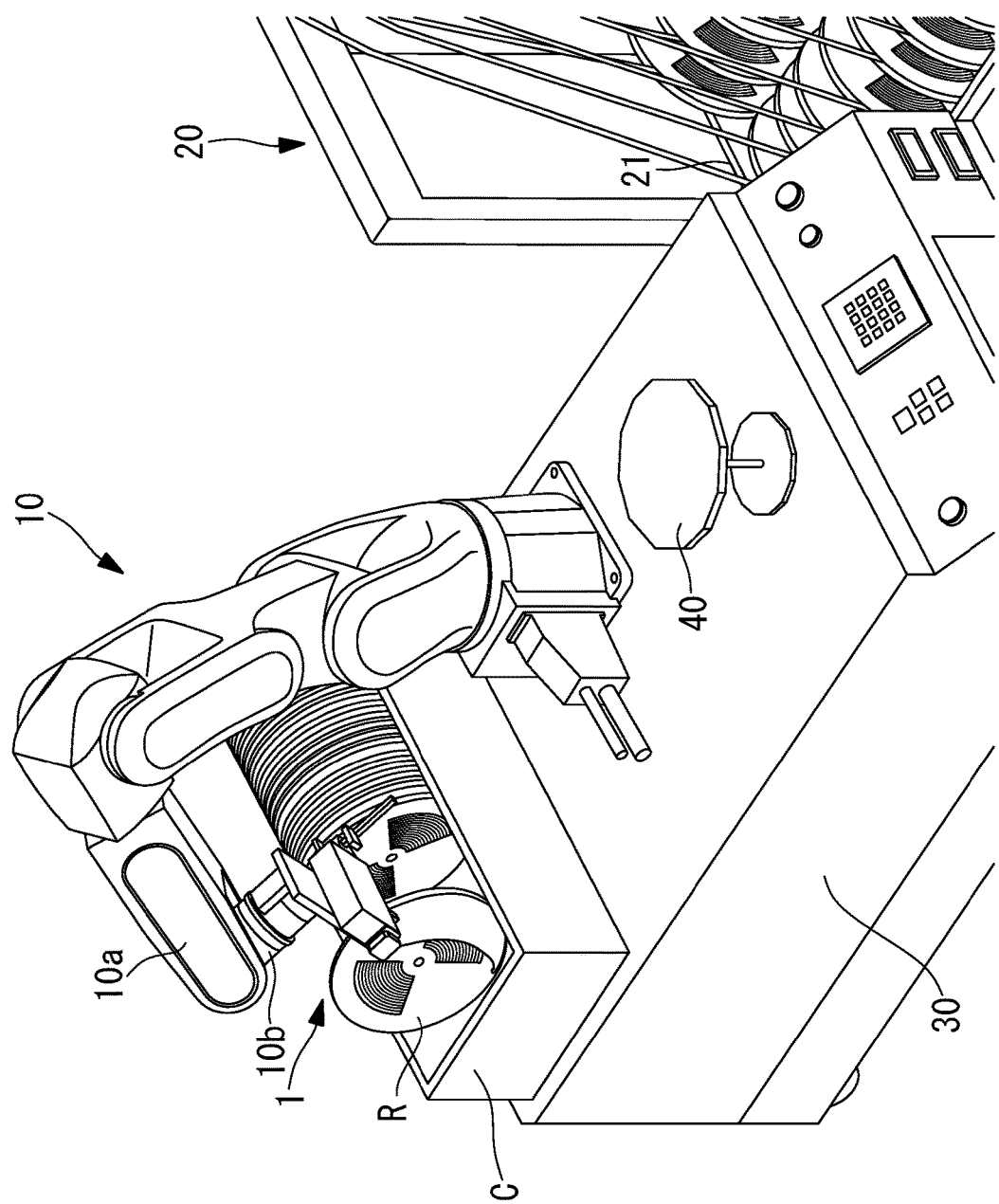
FIG. 7 is a view for illustration of a transferring operation of a tape reel to a reel table by a robot.

Next, operations of the robot hand 1 and the robot 10 will be described. The robot 10 carries out a setting operation of an unused tape reel R to a tape supply device 20 of a chip mounter according to control commands from the controller. As shown in FIG. 7, the robot 10 and a container C are placed on an automated guided vehicle (AGV) 30. The container C accommodates the unused tape reels R. On the AGV 30, a horizontal reel table 40 is fixed.

The tape supply device 20 includes: a reel rack 21 accommodating a plurality of tape reels R; and an auto loading feeder (hereinafter referred to as ALF) 22 for supplying the tape T from the tape reel R to a mounting position. Within the reel rack 21, a large number of tape reels R are arranged at small intervals. The ALF 22 has a plurality of tape transfer paths that are disposed in parallel to each other, and the tape transfer paths continue to the mounting position in the chip mounter through an introduction port 22a opening in front of the ALF 22 (cf., FIG. 15 and FIG. 16). The ALF 22 transfers the tape T along each tape transfer paths to the mounting position. The chip mounter transfers a substrate sequentially to a plurality of mounting positions, takes an electronic component out of the tape T at each of the mounting positions, and mounts the electronic component to the substrate at a predetermined position. Thus, a plurality of components is mounted on one substrate.

Figure 8:
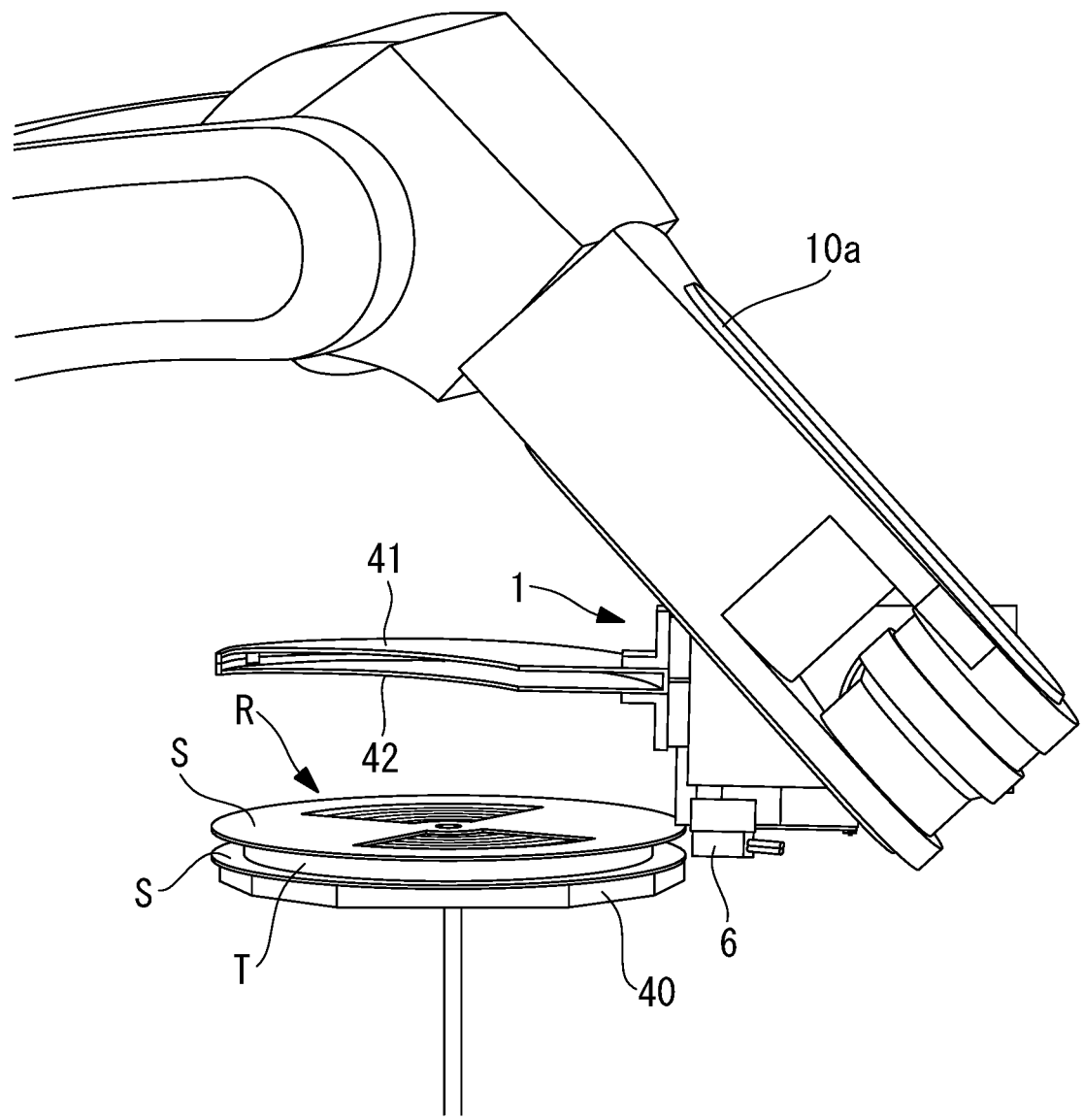
FIG. 8 is a view for illustration of a placing operation of the tape reel onto the reel table by the robot and a detecting operation of a fixation tape.

First, as shown in FIG. 7 through FIG. 10, the robot 10 performs a peeling operation of the fixation tape T' from the tape T of the unused tape reel R by the operation of the robot arm 10a and the robot hand 1. Specifically, as shown in FIG. 7, one of the tape reels R within the container C is accommodated and held between the pair of holding members 41 and 42 at the reel hold position. Then, as shown in FIG. 8, the tape reel R is placed on the reel table 40, and the robot hand 1 is removed from the tape reel R by horizontal movement of the robot hand 1.

Figure 9:
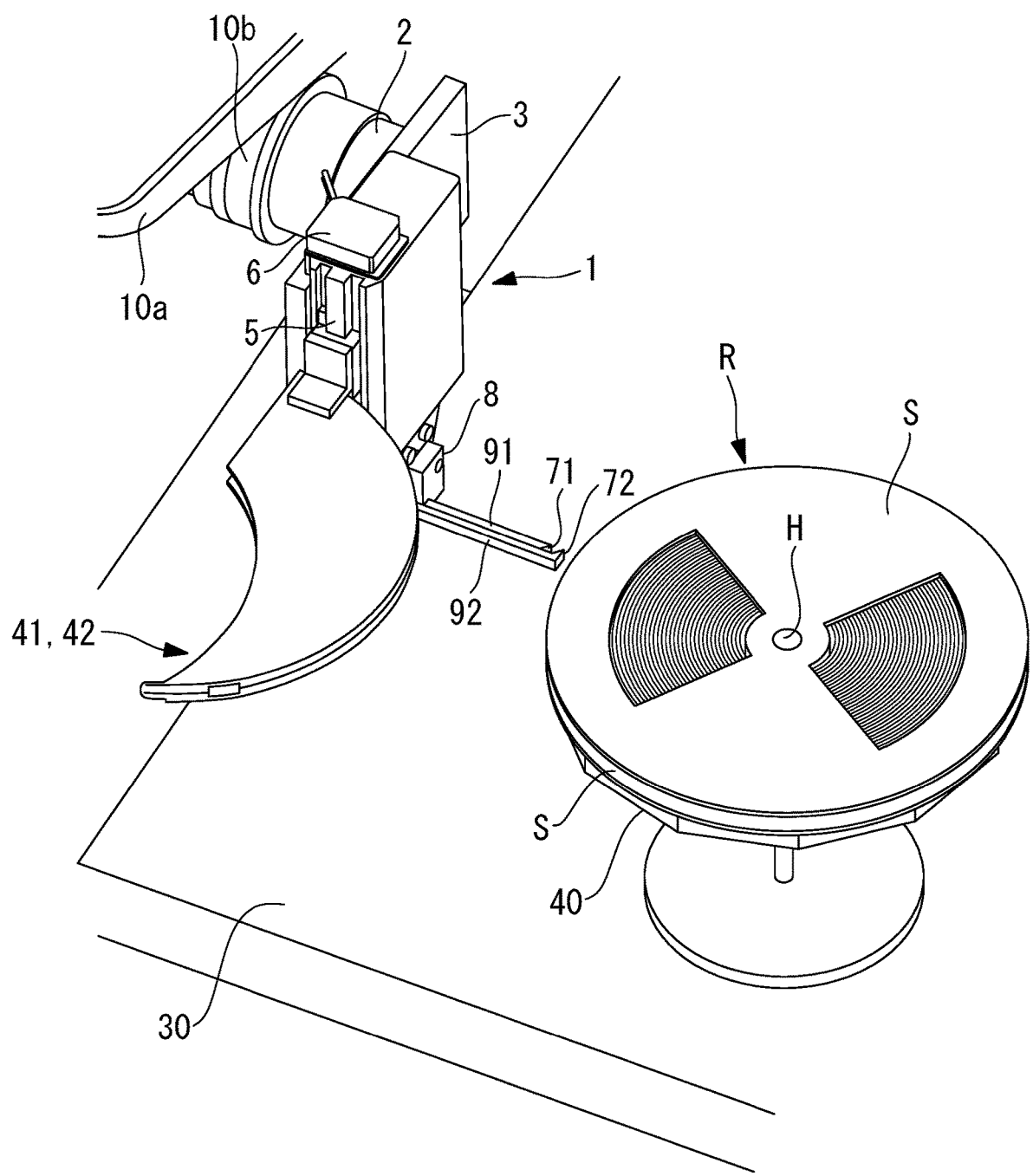
FIG. 9 is a view for illustration of a gripping operation of the fixation tape by the robot.
Figure 10:
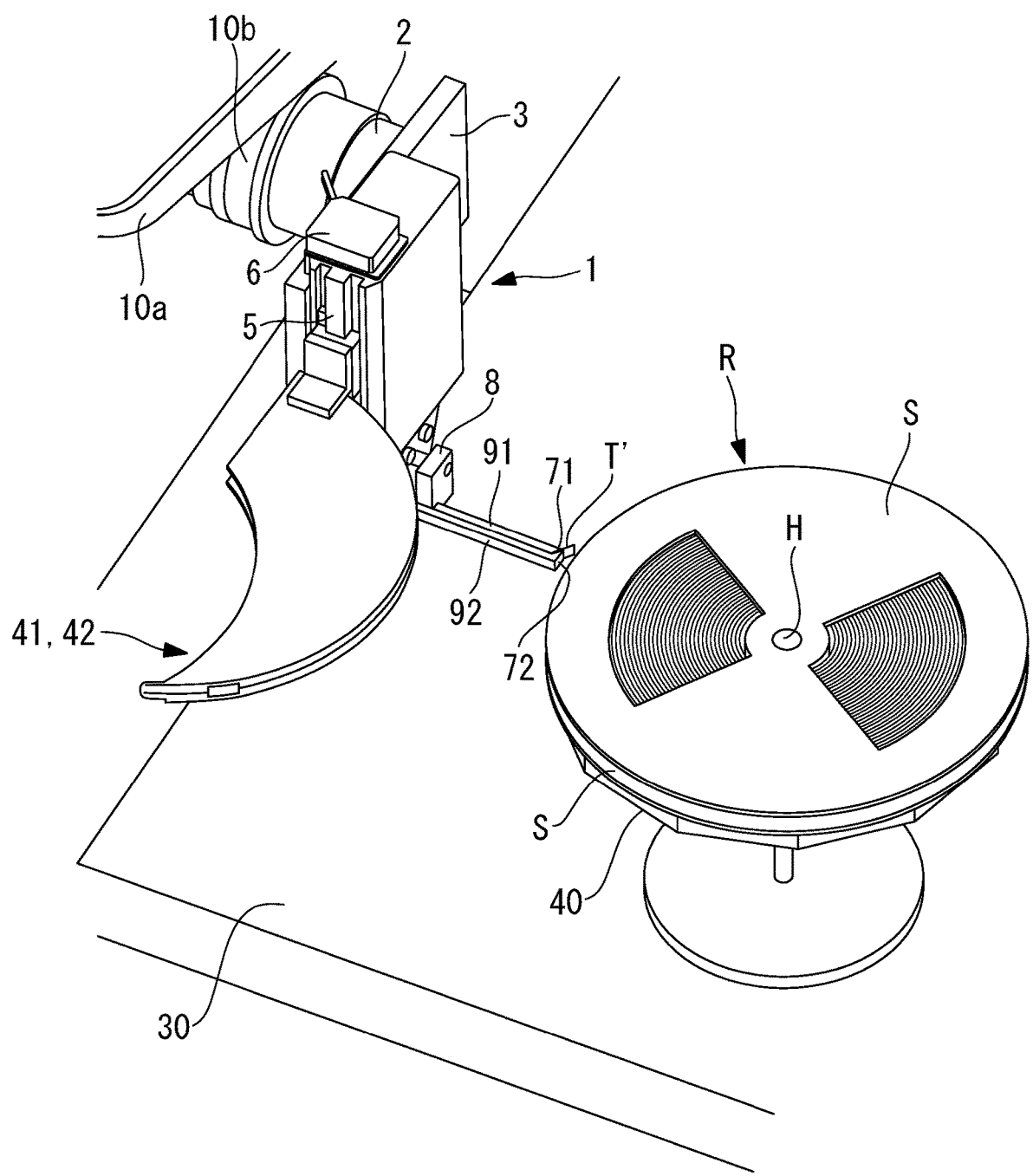
FIG. 10 is a view for illustration of a peeling operation of the fixation tape by the robot.

Next, as shown in FIG. 8, the sensor 6 is disposed radially outside the tape reel R, the fixation tape T' is detected by the sensor 6 by moving the sensor 6 along the circumferential direction of the tape reel R while directing the sensor 6 toward to the tape T. Then, by inserting the opened pair of gripping claws 71 and 72 between the pair of side plates S toward the detected fixation tape T' as shown in FIG. 9, and by closing the pair of gripping claws 71 and 72 as shown in FIG. 10, the fixation tape T' is gripped by the pair of gripping claws 71 and 72. Thereafter, by rotating the pair of gripping claws 71 and 72 about the shafts 91 and 92, the fixation tape T' is peeled from the leading end of the tape T, and the peeled fixation tape T' is put into a predetermined collection box (not shown).

Next, as shown in FIG. 11 through FIG. 16, the robot 10 performs a transferring operation of the tape reel R from the reel table 40 to the tape supply device 20 by the operation of the robot arm 10a and the robot hand 1, to set the tape reel R to an empty position of the reel rack 21.

Figure 11:
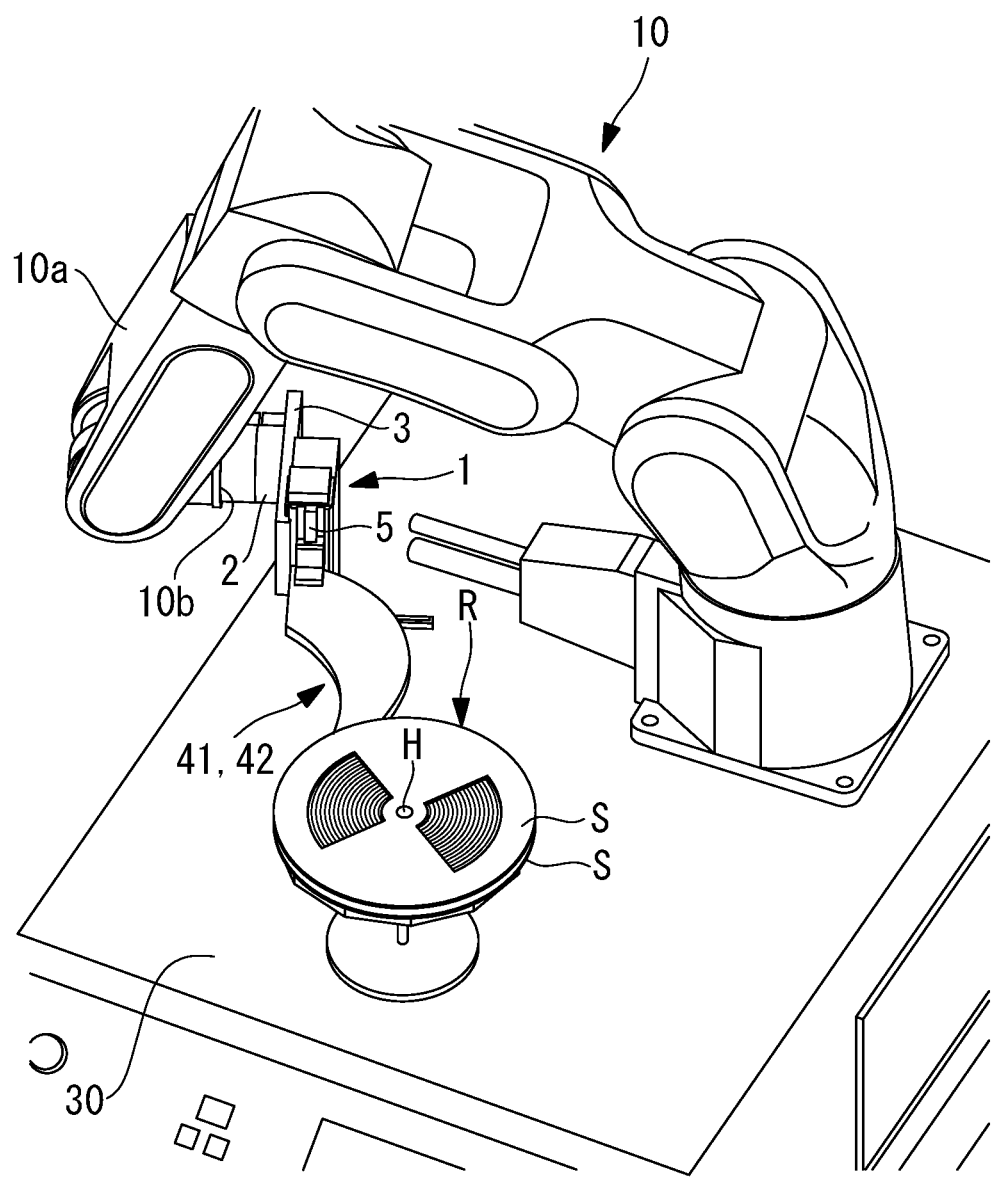
FIG. 11 is a view for illustration of a pulling operation of the tape out of the tape reel by the robot.
Figure 12:
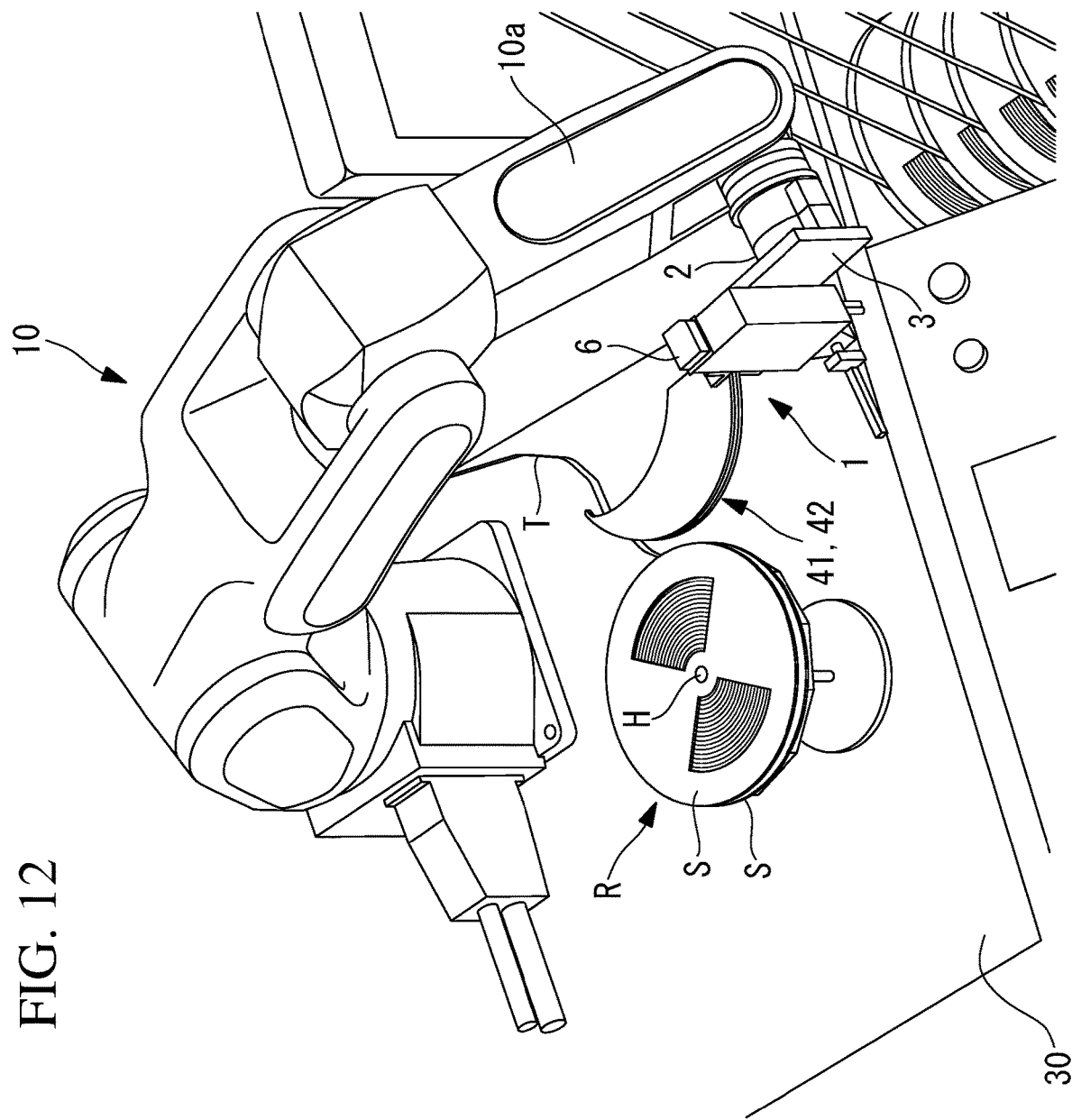
FIG. 12 is a view for illustration of a pulling operation of the tape out of the tape reel by the robot.

Specifically, as shown in FIG. 11, by inserting the tip ends of the pair of holding members 41 and 42 at the tape pull-out position between the pair of side plates S based on the position of the fixation tape T' detected by the sensor 6, the leading end of the tape T passes through the opening 43 from outside to inside of the main bodies 41a and 42a in a radial direction. At this time, by moving the opening 43 toward the leading end of the tape T in a direction opposite to a winding direction of the tape T by movement of the robot hand 1, the leading end of the tape T may be easily inserted through the opening 43 by pulling up the leading end of the tape T up radially outside the tape reel R by using the inclined surfaces 41e, 41f, 42e, and 42f. The leading end of the tape T moves toward the side of the tip end of the pair of holding members 41 and 42 along the inclined surfaces 41e and 42e. Subsequently, as shown in FIG. 12, by further moving the opening 43 in the direction opposite to the winding direction of the tape T, the tape T is pulled out of the tape reel R.

Figure 13:
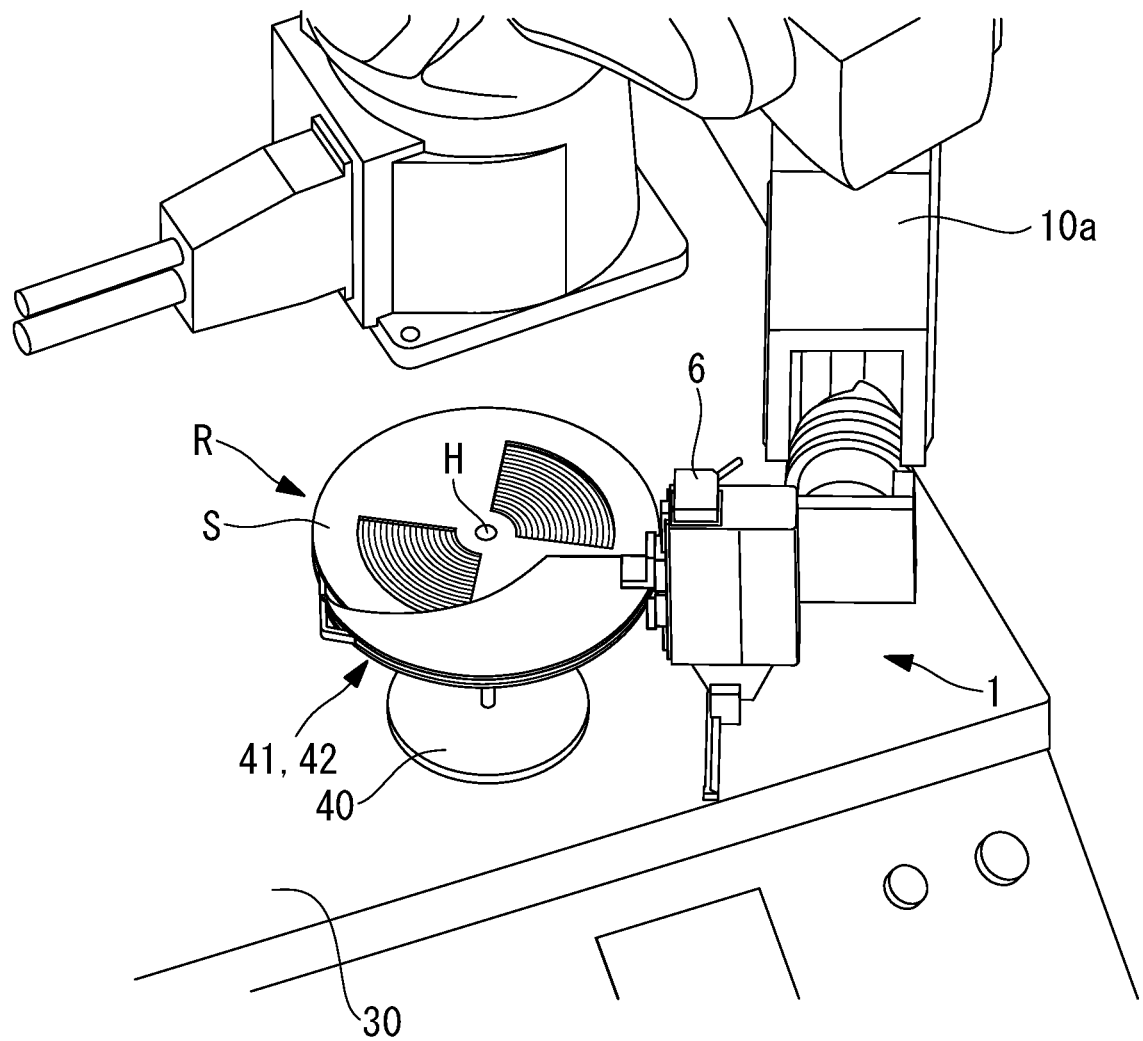
FIG. 13 is a view for illustration of a holding operation of the tape reel by the robot.
Figure 14:
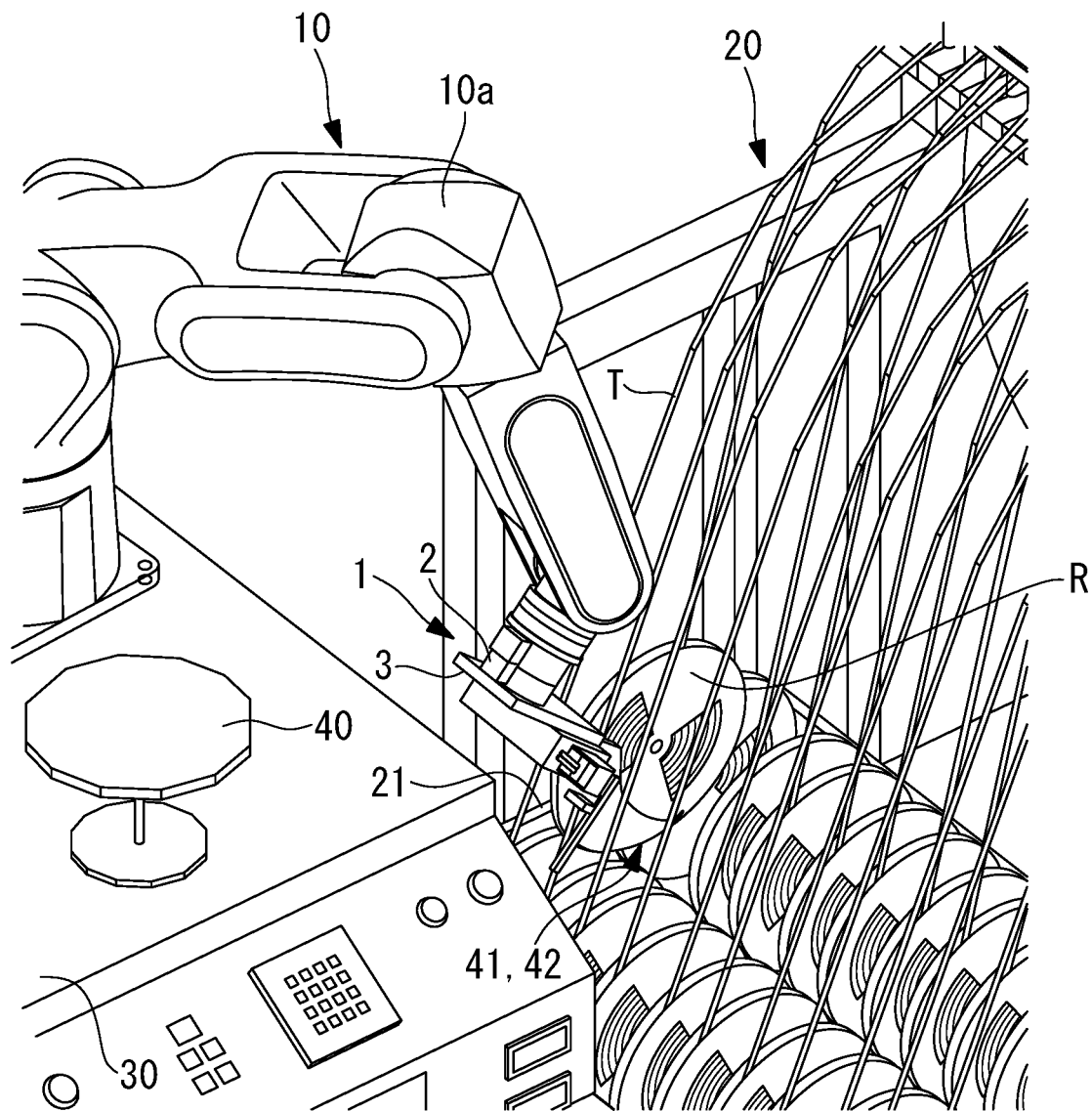
FIG. 14 is a view for illustration of a setting operation of the tape reel to a chip mounter by the robot.

Next, as shown in FIG. 13, the pair of holding members 41 and 42 are opened from the tape pull-out position to the reel hold position, the pair of holding members 41 and 42 are moved horizontally toward the tape reel R, and the tape reel R is accommodated and held within the pair of holding members 41 and 42 while the tape T is still inserted through the opening 43. Then, as shown in FIG. 14, the pair of holding members 41 and 42 and the tape reel R are disposed in a vertical direction such that the pair of holding members 41 and 42 accommodate a lower end portion of the tape reel R, and the tape reel R is moved near an empty position in the reel rack 21. Thereafter, the robot hand 1 is moved forward, and by rolling and dropping the tape reel R from the pair of holding members 41 and 42 into the empty position, the tape reel R is set in the empty position.

Figure 15:
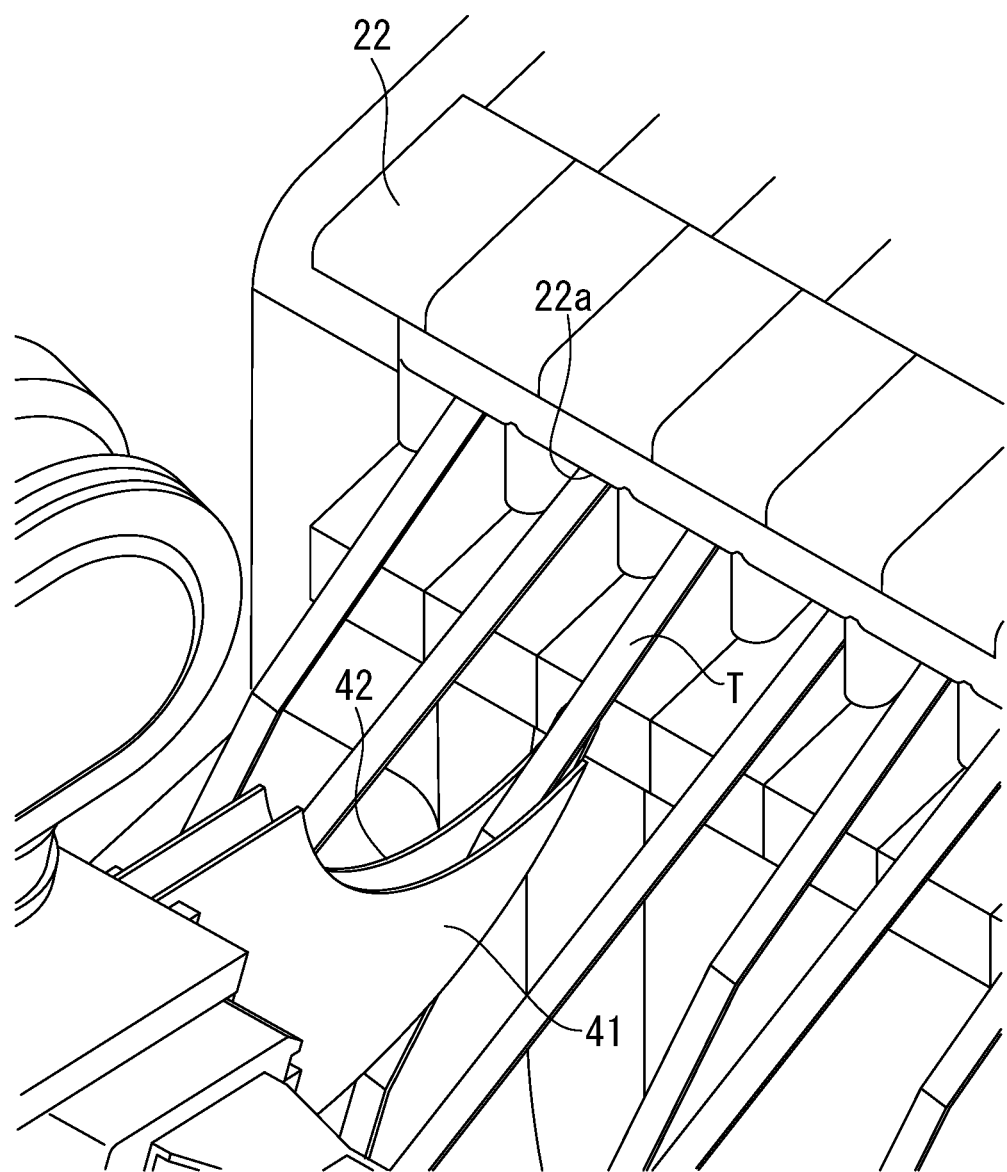
FIG. 15 is a view for illustration of a setting operation of a leading end of the tape to an ALF by the robot.
Figure 16:
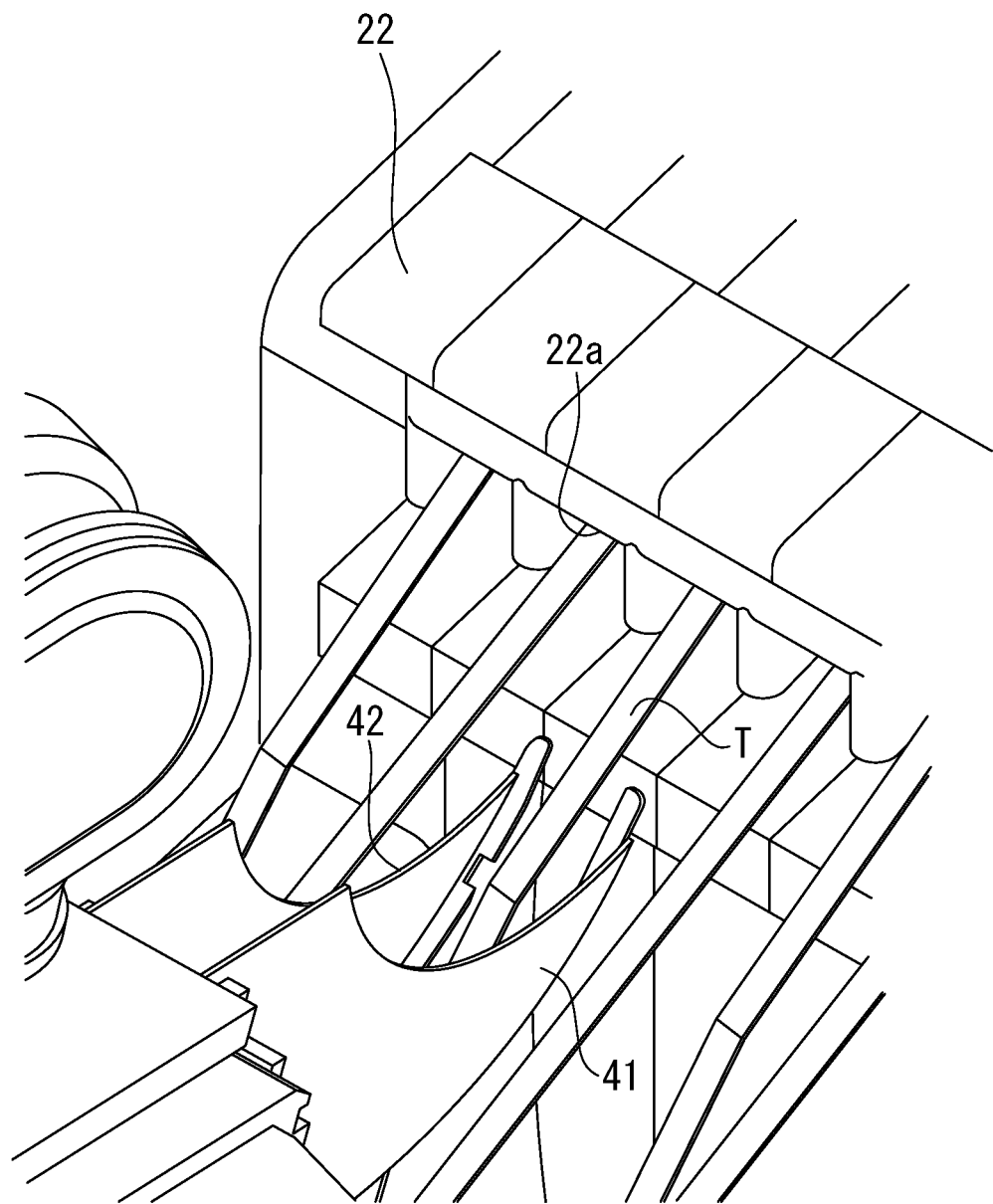
FIG. 16 is a view for illustration of a setting operation of the leading end of the tape to the ALF by the robot.

Next, by closing the pair of holding members 41 and 42 to the tape gripping position, the tape T is gripped in the width direction at the opening 43 of the pair of holding members 41 and 42. Then, as shown in FIG. 15, the robot hand 1 is moved near the introduction port 22a of the ALF 22, and the tape T is inserted into the introduction port 22a by movement of the robot hand 1. Thereafter, as shown in FIG. 16, the tape T is released by opening the pair of holding members 41 and 42.

As described above, the pair of holding members 41 and 42 of the robot hand 1 hold the tape reel R by receiving the tape reel R radially between the thin flat-plate-shape main bodies 41a and 42a. Specifically, the tape reel R may be held and transferred by the pair of holding members 41 and 42 slightly thicker than the tape reel R. With the pair of thin holding members 41 and 42 of this type, it is possible to set the unused tape reel R in the reel rack 21 without interfering with other tape reels R and tapes T around, and robotize the setting operation of the tape reel R which conventionally has to depend on manual operations by an operator.

Further, by providing the robot hand 1 with the sensor 6 for detecting the fixation tape T' and the gripping claws 71 and 72 for gripping the fixation tape T', it is possible to detect the fixation tape T' of the tape reel R and robotize the peeling operation of the fixation tape T'.

Moreover, as the outer peripheral surface of the tape reel R is supported by the rail portions 41b and 42b respectively provided on the inner surfaces of the main bodies 41a and 42a, regardless of movement of the robot hand 1 and change in its posture, the tape reel R is stably held between the pair of holding members 41 and 42 without falling from the pair of holding members 41 and 42. With this, it is possible to carry out high-speed handling of the tape reel R.

Furthermore, the flat-plate-shape main bodies 41a and 42a lightly support the side plates S of the tape reel R with a large area. Specifically, in a state in which the tape reel R is held by the pair of holding members 41 and 42, a force applied to the positions of the tape reel R from the holding members 41 and 42 is small. With this, it is possible to hold and transfer the tape reel R by the holding members 41 and 42 without applying a force to electronic components on the tape T.

Furthermore, by providing the rail portions 41b and 42b with the opening 43 through which the tape T is allowed to pass and with which the tape T can be gripped, it is possible to carry out handling of the tape T in addition to handling of the tape reel R. With this, it is also possible to robotize the pulling operations of the tape T from the tape reel R and for setting the tape T in the introduction port 22a of the ALF 22. In particular, by providing the opening 43 at the tip end portions of the rail portions 41b and 42b, the pair of holding members 41 and 42 is able to grip the tape T by the tip end portions with a narrow width. This facilitates handling of the tape T in a narrow space.

Figure 17:
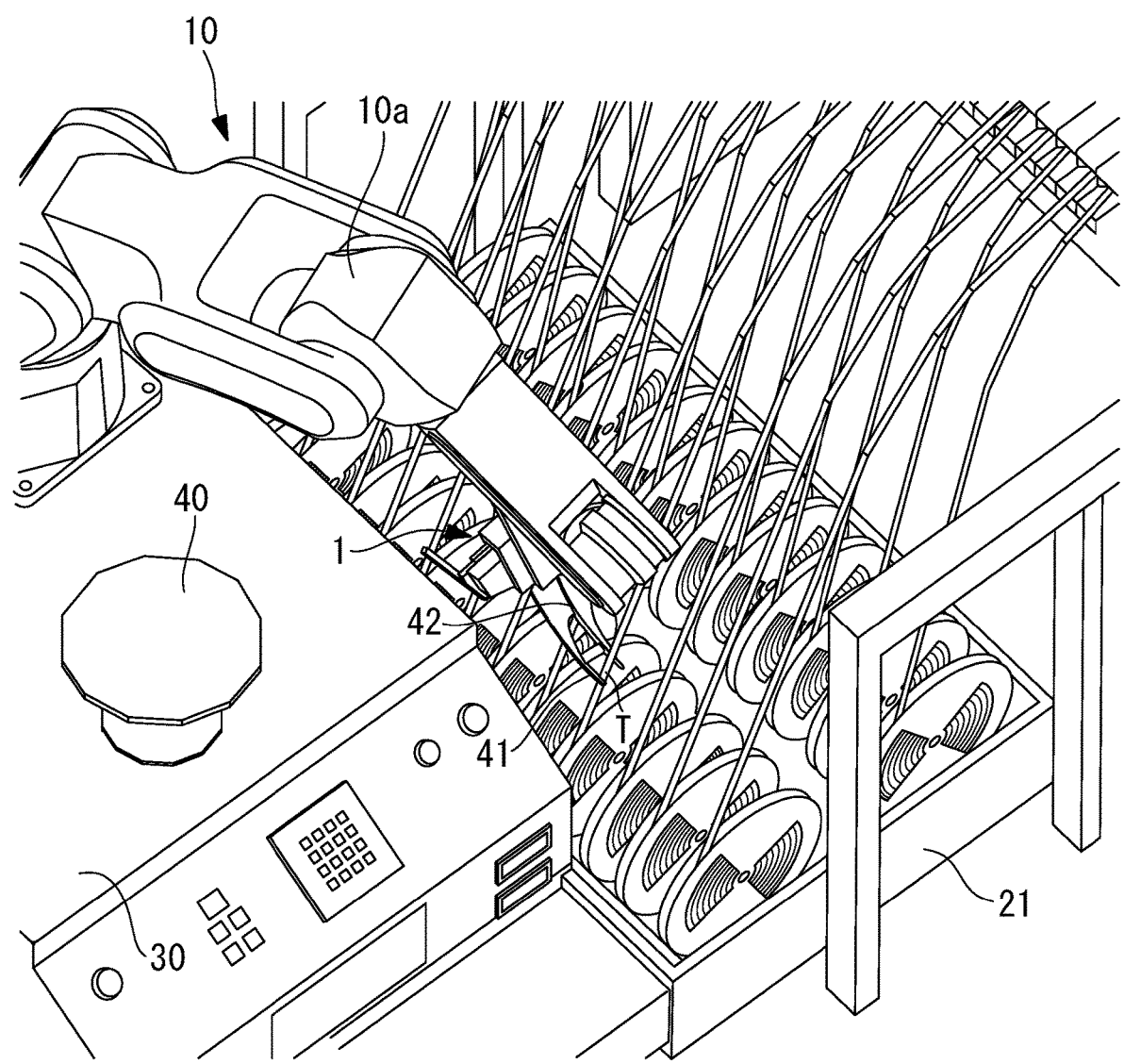
FIG. 17 is a view for illustration of a pulling operation of the tape out of the tape reel by the robot.
Figure 18:
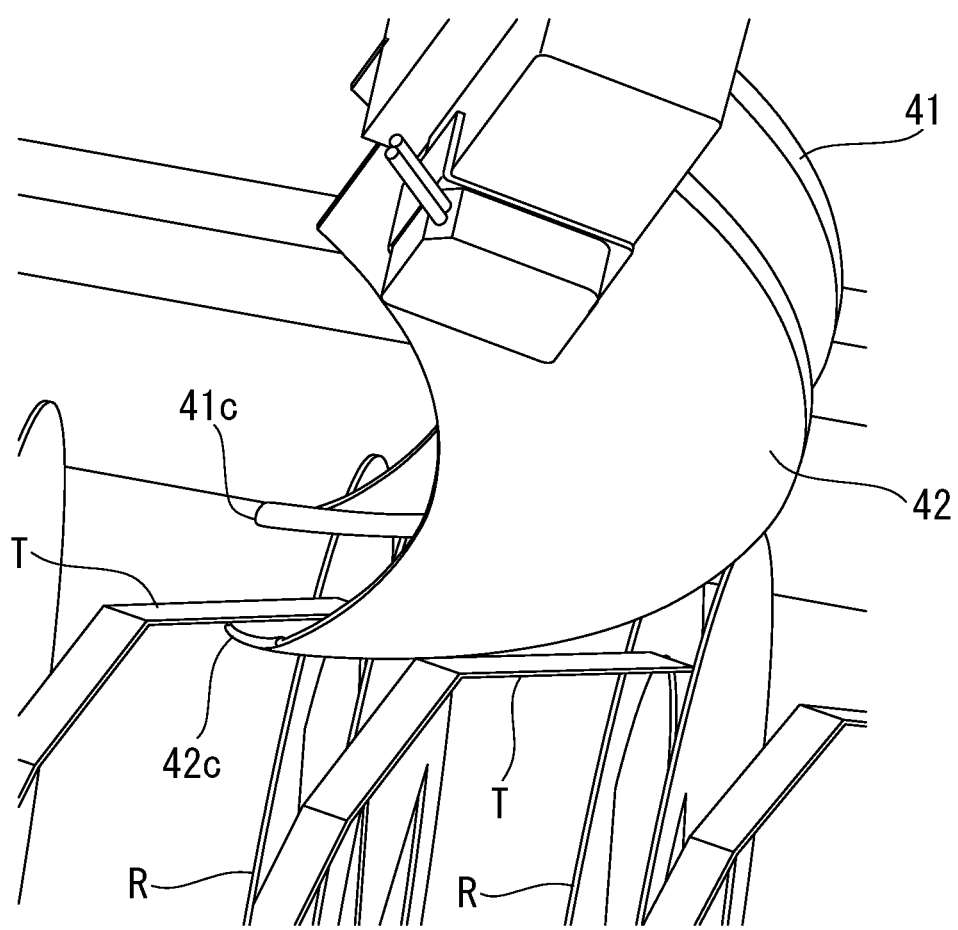
FIG. 18 is a view for illustration of a gripping operation of the tape by the robot.

In a case in which the ALF 22 employs the tape splicing method, the robot 10 may perform a setting operation of a terminal end of the tape T to a splicing device, as shown in FIG. 17 through FIG. 18. The splicing method is a method for connecting a terminal end of one tape T that is being supplied to a mounting position on a chip mounter to a leading end of another tape T. In this case, as shown in FIG. 18, by being closed by the actuator 5, the pair of holding members 41 and 42 lightly grip the tape T in a thickness direction between the tip end portions of the rail portions 41b and 42b.

As shown in FIG. 17, the robot 10 pulls the tape T gripped by the pair of holding members 41 and 42 by movement of the robot hand 1, and pulls the tape T remaining in the tape reel R in the reel rack 21. Then, the robot 10 sets a terminal end of the pulled tape T to a predetermined position of the splicing device.

The tapes T pulled from the plurality of tape reels R within the reel rack 21 are arranged at small intervals. According to this embodiment, it is possible to easily insert the thin projecting portions 41c and 42c provided at the tip end of the pair of holding members 41 and 42 into a narrow gap between the tapes T, and to grip a target tape T using the projecting portions 41c and 42c.

Further, as the main bodies 41a and 42a are partially circular, it is possible to change the orientation of the main bodies 41a and 42a without moving the main bodies 41a and 42a by rotating the main bodies 41a and 42a around their center. Therefore, as shown in FIG. 18, it is possible to insert and grip the target tape T between the projecting portions 41c and 42c by rotation of the holding members 41 and 42 at the same position, without affecting surrounding tapes T.

In the above embodiment, the sensor 6 for detecting the fixation tape T' is provided for the robot hand 1. However, instead, the sensor 6 separate from the robot hand 1 may be provided around the reel table 40. In the above embodiment, the main bodies 41a and 42a have a shape of a part of a circle. However, instead, the main bodies 41a and 42a may have a different shape such as a rectangle. Further, the shape of the rail portions 41b and 42b may be changed according to the shape of the main bodies 41a and 42a. In the above embodiment, the opening 43 is provided at the tip end portions of the rail portions 41b and 42b. However, instead, the opening 43 may be disposed at a different position of the rail portions 41b and 42b. For example, the opening 43 may be disposed at a central portion of the rail portions 41b and 42b in the longitudinal direction.

The invention claimed is:

1. A robot hand that holds a tape reel having a pair of circular side plates facing each other, the robot hand comprising:
   a pair of holding members each having a flat-plate-shape main body, the pair of holding members configured to receive the tape reel in a radial direction of the tape reel so that the tape reel is located between the pair of main bodies facing each other; and
   an actuator configured to open and close the pair of holding members in a facing direction of the pair of main bodies, the facing direction being a direction in which the pair of main bodies are facing each other, wherein
   the pair of holding members are openable and closable by the actuator between a reel hold position and a tape pull-out position, the reel hold position is a position at which a distance between inner surfaces of the pair of main bodies is greater than a distance between outer surfaces of the pair of side plates, the tape pull-out position is a position at which a distance between outer surface of the pair of main bodies is smaller than a distance between inner surfaces of the pair of side plates, each of the pair of holding members includes:
   a rail portion projecting from the inner surface of the main body, the rail portion extending along a circumference portion of the main body radially at an outside of the side plates; and
   a cut-out provided in the rail portion, wherein the cut-outs of the pair of holding members form an opening in a state in which the pair of holding members are placed at the tape pull-out position, the opening has a width greater than a width of a tape wound around the tape reel so as to allow the tape to pass through the opening;
wherein the holding members are configured to grip the tape between the pair of rail portions when the actuator closes the pair of holding members.

2. The robot hand according to claim 1, wherein
the inner surface of the cut-out on one side in a longitudinal direction of the rail portion is an inclined surface that is inclined with respect to the longitudinal direction of the rail portion.

3. The robot hand according to claim 2, wherein
the pair of holding members are connected to the actuator at the other side in the longitudinal direction of the rail portions, and
the inclined surface is inclined inwardly of the rail portion from the other side toward the one side of the rail portion.

4. The robot hand according to claim 1, wherein
the main bodies have a shape of a part of a circle having a radius substantially equal to a radius of the tape reel, and
each of the rail portions extends along an arc of the corresponding main body.

5. The robot hand according to claim 1, wherein
each of the rail portions has a projecting portion projecting from the corresponding main body in a longitudinal direction of the rail portion, and
in a state in which the pair of holding members are closed, a tip end portion of the pair of projecting portions is configured to be gradually tapered toward tip ends.

6. The robot hand according to claim 1, wherein
the opening is provided at a tip end portion of the pair of rail portions.

7. The robot hand according to claim 1, further comprising:
a pair of gripping claws insertable between the pair of side plates, wherein the gripping claws grip a fixation tape in a thickness direction of the fixation tape, the fixation tape being attached to a leading end of the tape.

8. The robot hand that holds a tape reel having a pair of circular side plates facing each other, the robot hand comprising:
a pair of holding members each having a flat-plate-shape main body, the pair of holding members configured to receive the tape reel in a radial direction of the tape reel so that the tape reel is located between the pair of main bodies facing each other; and
an actuator configured to open and close the pair of holding members in a facing direction of the pair of main bodies, the facing direction being a direction in which the pair of main bodies are facing each other, wherein
the pair of holding members are openable and closable by the actuator between a reel hold position and a tape pull-out position, the reel hold position is a position at which a distance between inner surfaces of the pair of main bodies is greater than a distance between outer surfaces of the pair of side plates, the tape pull-out position is a position at which a distance between outer surface of the pair of main bodies is smaller than a distance between inner surfaces of the pair of side plates, each of the pair of holding members includes:
   a rail portion projecting from the inner surface of the main body, the rail portion extending along a circumference portion of the main body radially at an outside of the side plates; and
   a cut-out provided in the rail portion, wherein the cut-outs of the pair of holding members form an opening in a state in which the pair of holding members are placed at the tape pull-out position, the opening has a width greater than a width of a tape wound around the tape reel so as to allow the tape to pass through the opening, wherein
the holding members are configured to grip the tape in the opening in a direction along the width of the tape by the actuator further closing the pair of holding members from the tape pull-out position.

9. The robot hand that holds a tape reel having a pair of circular side plates facing each other, the robot hand comprising:
a pair of holding members each having a flat-plate-shape main body, the pair of holding members configured to receive the tape reel in a radial direction of the tape reel so that the tape reel is located between the pair of main bodies facing each other; and
an actuator configured to open and close the pair of holding members in a facing direction of the pair of main bodies, the facing direction being a direction in which the pair of main bodies are facing each other, wherein
the pair of holding members are openable and closable by the actuator between a reel hold position and a tape pull-out position, the reel hold position is a position at which a distance between inner surfaces of the pair of main bodies is greater than a distance between outer surfaces of the pair of side plates, the tape pull-out position is a position at which a distance between outer surface of the pair of main bodies is smaller than a distance between inner surfaces of the pair of side plates, each of the pair of holding members includes:
   a rail portion projecting from the inner surface of the main body, the rail portion extending along a circumference portion of the main body radially at an outside of the side plates; and
   a cut-out provided in the rail portion, wherein the cut-outs of the pair of holding members form an opening in a state in which the pair of holding members are placed at the tape pull-out position, the opening has a width greater than a width of a tape wound around the tape reel so as to allow the tape to pass through the opening, wherein the robot hand further comprises
a sensor configured to detect a fixation tape attached to a leading end of the tape.

10. A robot comprising:

a robot arm; and a robot hand comprising a pair of holding members each having a flat-plate-shape main body, the pair of holding members configured to receive the tape reel in a radial direction of the tape reel so that the tape reel is located between the pair of main bodies facing each other; and an actuator configured to open and close the pair of holding members in a facing direction of the pair of main bodies, the facing direction being a direction in which the pair of main bodies are facing each other, wherein the pair of holding members are openable and closable by the actuator between a reel hold position and a tape pull-out position, the reel hold position is a position at which a distance between inner surfaces of the pair of main bodies is greater than a distance between outer surfaces of the pair of side plates, the tape pull-out position is a position at which a distance between outer surface of the pair of main bodies is smaller than a distance between inner surfaces of the pair of side plates, each of the pair of holding members includes:

a rail portion projecting from the inner surface of the main body, the rail portion extending along a circumference portion of the main body radially at an outside of the side plates; and a cut-out provided in the rail portion, wherein the cut-outs of the pair of holding members form an opening in a state in which the pair of holding members are placed at the tape pull-out position, the opening has a width greater than a width of a tape wound around the tape reel so as to allow the tape to pass through the opening, the opening is provided at a tip end portion of the rail portion, the robot hand being connected to a tip end of the robot arm.

* * * * *